United States Patent Office 2,891,640
Patented June 23, 1959

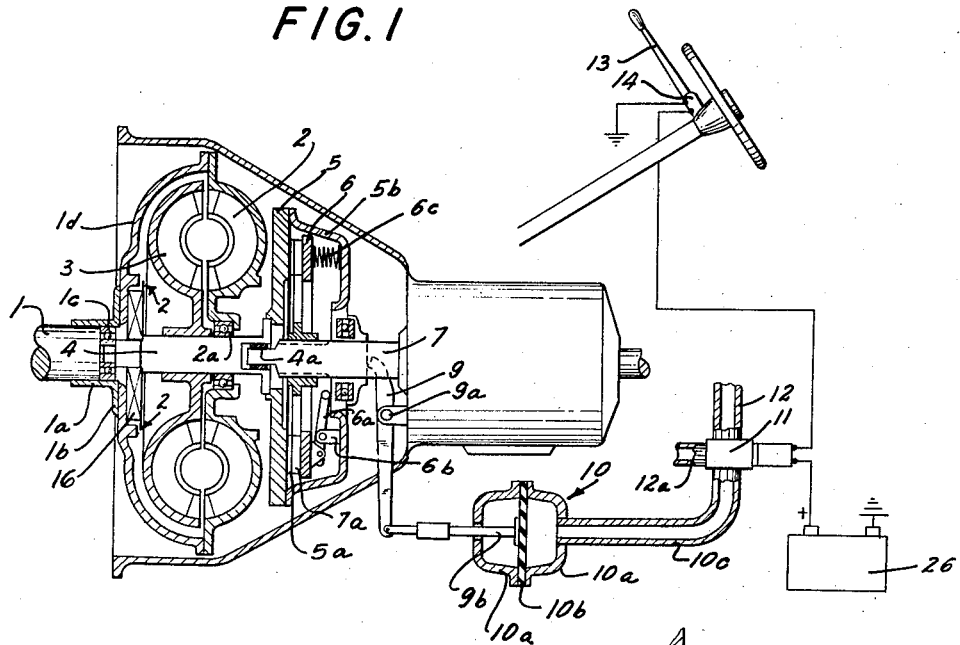

2,891,640
CLUTCH ARRANGEMENT
Richard Binder, Schweinfurt, Germany, assignor to Fichtel & Sachs A.G., Schweinfurt, Germany Application March 5, 1956, Serial No. 569,649
Claims priority, application Germany March 3, 1955
25 Claims. (Cl. 192—3.5)

The present invention relates to a clutch arrangement.

More particularly, the present invention relates to a clutch arrangement which is particularly adapted to be used in motor vehicles.

There exist clutch arrangements which incorporate a fluid clutch for establishing a driving connection between a drive shaft connected to the vehicle engine and a driven shaft connected to the driving wheels of the vehicle. It is well known, however, that unless either the drive or driven shaft rotates at at least a minimum speed on substantial power-transmitting relation between the shafts is established. Consequently, if for some reason or other it is desired to start the engine of a vehicle, which engine is usually of the internal combustion or other non-self-starting type, the vehicle must move at relatively high speed before the fluid clutch serves power transmittingly to couple the driven and drive shafts of the vehicle.

It is therefore an object of the present invention to provide a clutch arrangement which incorporates a fluid clutch but which overcomes the above disadvantages.

It is another object of the present invention to provide a clutch arrangement for use in a motor vehicle or the like, which clutch arrangement includes a fluid clutch for normally coupling the drive and driven shafts of the vehicle and which clutch arrangement is provided with an additional mechanical clutch for power transmittingly coupling the drive and driven shafts to each other at such time as the engine and consequently the drive shaft are at a standstill and when the vehicle is moved by an outside force at a very low speed, thereby making it possible for the engine to be cranked without is being necessary to move the vehicle at high speed.

The objects of the present invention also include provision of a clutch arrangement which incorporates the fluid clutch but which is capable of power transmittingly connecting the drive and driven shafts of the vehicle at such times as both shafts are at or nearly at a standstill, thereby making it possible for the engine to be used as an auxiliary brake.

It is a still further object of the present invention to provide a clutch arrangement which is sturdy, which may be built at very low cost and which will give long periods of trouble free service.

With the above objects in view, the present invention mainly resides in a clutch arrangement which comprises first and second rotatable shafts, fluid clutch means interconnecting the shafts for placing the same into substantial power-transmitting relation with each other when at least one of the shafts rotates at at least a predetermined speed, and mechanical clutch means interconnecting the shafts for coupling the same to each other when both shafts rotate in one direction with the first shaft rotating below the predetermined speed and not faster than the second shaft. If desired, the mechanical clutch means may be slipping clutch means so as to couple the shafts to each other when the torque transmitted from one of the shafts to the other of the shafts does not exceed a predetermined torque.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Fig. 1 is a sectional view of a preferred embodiment of the present invention;

Fig. 2 is a fragmentary view, partly in section, of a part of the present invention taken substantially along line 2—2 of Fig. 1; and Fig. 3 is a sectional view taken substantially along line 3—3 of Fig. 2.

Referring now to the drawings, and to Fig. 1 thereof in particular, there is shown a clutch arrangement according to the present invention. The same includes consecutive first, second and third shafts 1, 4 and 7, the shafts being rotatable about a common central axis of rotation. As viewed in Fig. 1, the right free end of the shaft 1 carries a sleeve 1a which projects beyond the free end of the shaft 1 and is formed with an annular flange 1b. The left free end of the shaft 4 projects into the sleeve 1a and stops short of the right free end of the shaft 1. A suitable bearing arrangement 1c is provided for permitting free rotation of the shafts 1 and 4 relative to each other.

The right free end of the shaft 4 is formed with a recess into which the left free end of the shaft 7 projects. A suitable bearing arrangement 4a is provided so that the shafts 4 and 7 are also freely rotatable relative to each other.

The clutch arrangement, which will be described in detail below, is particularly suited for use in a self-propelled vehicle having an internal combustion engine and at least one driving wheel (not shown). The shaft 1 is adapted to constitute or be connected to the crank shaft of the internal combustion engine in such a manner that the same, during normal operation, drives the shaft so that the shaft 1 is the driving shaft of the vehicle.

The shaft 7 is adapted to be connected to the driving wheel so that the shaft 7 constitutes the driven shaft. In practice, the shaft 7 is connected to a differential which drives the rear wheels of the vehicle, in a manner well known in the art.

The shaft 4 constitutes an intermediate shaft which is mounted for free rotation relative to the shafts 1 and 7, as set forth above.

The clutch arrangement according to the present invention incorporates a fluid clutch capable of transmitting a driving torque from the engine to the drive wheels of the vehicle. The fluid clutch comprises a substantially cup-shaped fly wheel 1d which is connected to the flange 1b and is thus rotatable with the shaft 1, and an impeller 2 which is connected to the fly wheel 1d for rotation therewith. Suitable bearing means 2a are provided for mounting the impeller 2 for free rotation relative to the shaft 4. The fly wheel 1d and the impeller 2 together define a fluid clutch chamber within which another impeller 3 is arranged. The latter is carried by the shaft 4 for rotation therewith. The fluid clutch chamber is filled with a suitable hydraulic fluid so that the impellers 2 and 3 are capable of cooperating with each other in such a manner as power transmittingly to couple the shafts 1 and 4 to each other. As is well known in the art, however, the torque or power transmitting capability of a fluid clutch is very low when both impellers rotate below a certain rotational speed. In practice, the torque or power transmitting capability of a fluid clutch incorporated in a motor vehicle is negligible or insubstantial when neither impeller rotates at least as fast as that rotational speed at which the driver impeller rotates when the engine idles. In other words, when the engine idles the impeller 2 will be rotated at a certain rotational speed, and so long as neither impeller 2 nor impeller 3 rotates above that speed there is no substantial power-transmitting coupled relation between the shafts 1 and 4. It is only when at least one of the impellers rotates at a higher speed that the fluid clutch is capable of placing the shafts 1 and 4 into substantial power-transmitting coupled relation with each other.

It is well known that occasionally the starter or cranking mechanism by means of which the vehicle engine is ordinarily started or cranked fails to operate. It is possible, however, to crank the engine by driving the shaft 1. This may be accomplished by rotating the shaft 4 in a suitable manner, as, for example, by connecting the shaft 4 to the shaft 7 so that these two shafts are non-rotatably coupled to each other. This may be done by an additional clutch mechanism which will be described below, so that when the shafts 4 and 7 are non-rotatably coupled to each other, the vehicle may be pushed or permitted to roll, thereby rotating the shaft 4 together with the impeller 3. This, in turn, will cause rotation of the impeller 2 and consequently of the shaft 1.

In practice, it has been found the shaft 4 must rotate at a high speed so as to render the fluid clutch effective. High rotational speed of the shaft 4, however, can be obtained only when the vehicle moves quite fast. Thus, if the operator of the vehicle attempts to crank the engine by permitting the vehicle to roll down hill the vehicle must be permitted to coast until it attains sufficient speed. The operator must therefore be fortunate enough to have his vehicle so positioned that the necessary speed can be attained before the bottom of the incline is reached. Otherwise, it will not be possible to crank the engine in this manner.

According to the present invention this disadvantage is overcome by providing mechanical clutch means interconnecting the shafts 1 and 4 for power transmittingly coupling the same to each other when the shaft 1 is at a standstill or rotates slower than the rotational speed at which it rotates when the internal combustion engine idles. Such clutch means are shown schematically at 16 in Fig. 1 being arranged within the fluid clutch chamber and interposed between the shaft 4 and the fly wheel 1d. Alternatively, the mechanical clutch means 16 may be located exteriorly of the fluid clutch chamber and be interposed between the shaft 4 and the impeller 2.

If desired, the above described mechanical clutch means may be a slipping clutch.

A preferred embodiment of a suitable mechanical clutch 16 is shown in Figs. 2 and 3. At least one clutching means or element 17 is mounted for rotation with the shaft 1 and may be carried by the fly wheel 1d. The clutching element 17 is mounted upon a pin or rod 18 which extends substantially parallel to the axis about which the shafts 1 and 4 rotate so that the element 17 is pivotable about the pin 18 in the direction of the arrow 17a. A retaining yoke or the like 18a may be provided for securing the element 17 on the pin 18. A spring 19 is provided for biasing the element 17 for rotation in a clockwise direction about the pin 18, as viewed in Fig. 2. The arrangement of the parts is such that the pivot axis of the element 17 is spaced from the center of gravity of this element so that when the shaft 1 and the fly wheel 1d rotate the element 17 will be centrifuged and pivot in a counter clockwise direction against the action of the spring 19. Thus, when the fly wheel 1d is at a standstill or rotates at a relatively low speed the element 17 will assume the position shown in Fig. 2 in dotted lines, whereas when the fly wheel 1d rotates faster the element 17 will be centrifuged into the position shown in solid lines.

The element 17 cooperates with another clutching element 20 which is formed as a ratchet disc having teeth 20a. The disc 20 is rotatably carried by a hub 21, a key 21a being provided for preventing relative rotation between the hub 21 and the shaft 4. The disc 20 is formed with cutout portions 20b adapted to receive radially projecting lugs 22a of a friction disc 22. The latter is interposed between two friction discs 23 which are formed with inwardly projecting radial lugs 23a which are received within cutouts 21b of the hub 21. Thus, the friction disc 22 and the ratchet disc 20 are non-rotatably connected to each other, and similarly, the friction discs 23 and the hub 21 are non-rotatable relative to each other. The friction discs 22 and 23 are in frictional engagement with each other, and an annular spring disc 24 may be provided for constantly urging the friction discs into such frictional engagement with each other. The force with which the spring acts may be adjusted by a spring retaining member or nut 25 which is mounted on the hub 21 and is axially movable relative thereto. If desired, the nut 25 may be threaded on the hub 21, so that by rotating the nut 25 the force with which the spring disc 24 engages the rightwardmost friction disc 23 may be varied.

It will be seen from the above that when more than a certain torque is sought to be transmitted between the disc 20 and the shaft 4 slippage will occur. However, by varying the force with which the spring 24 acts on the friction disc 22, 23, the maximum permissible torque which can be transmitted between the shaft 4 and the disc 20 may be adjusted.

As set forth above, the clutching element 17 is movable between the positions shown in solid and dotted lines in Fig. 2. It will be understood that the positions shown in solid lines constitutes a disengaged position wherein the clutching elements 17 and 20 are out of engagement with each other, whereas the position shown in dotted lines constitutes an engaged position wherein the elements 17 and 20 are in engagement with each other.

The arrangement of the parts is such that during normal operation the engine will rotate the fly wheel in the direction of the arrow 1e. Moreover, the shape of the element 17 and the strength of the spring 19 are so selected that when the engine rotates somewhat slower than normal idling speed, the centrifugal force acting on the element 17 will be insufficient to overcome the force of the spring 19. The element 17 will therefore assume its engaged position, shown in dotted lines. However, when the engine runs at least at its idling speed, the centrifugal force acting on the element 17 will be sufficient to overcome the force of the spring 19 and will cause the element 17 to assume its disengaged position, shown in solid lines. Thus, irrespective of any other consideration, when the engine does not run slower than its normal idling speed, the mechanical clutch 16 does not power transmittingly couple the shafts 1 and 4 to each other. At such time, the only coupling effect between the shafts 1 and 4 is brought about by the impellers 2 and 3 so that the shaft 4 will also rotate in the direction of the arrow 1e.

When it is sought to start or crank the engine by pushing the vehicle or by permitting it to roll, the drive wheels of the vehicle will rotate the shaft 4 and consequently the clutch element 20 in the direction of the arrow 1e. Inasmuch as the engine is at a standstill, the element 17 will be in its engaged position so that as soon as the clutch element 20 commences to rotate, one of the teeth 20a will engage the clutch element 17 and thus rotate the fly wheel 1d together with the shaft 1 in the direction of the arrow 1e. Thus, the shafts 4 and 1 are power transmittingly coupled to each other by way of the mechanical clutch so that it is possible to crank the engine while the vehicle is moving at a very low speed. Obviously, if no mechanical clutch were provided, the shaft 4 would have to rotate at a relatively high speed so as to cause the fluid clutch to become effective.

Also, by providing a mechanical connection between the shafts 1 and 4, the engine may be used as an auxiliary brake which serves to impede rotation of the shaft 4 at such time as the shaft 1 is at a standstill. Clearly, the fluid clutch alone would not suffice power transmittingly to couple the shafts 1 and 4 to each other while these shafts are at a standstill.

In practice, the position of the nut 25 is so selected that the ratchet disc 20 will slip relative to the shaft 4 when approximately 20 to 50% of the maximum permissible torque capable of being transmitted between the shafts 1 and 4 is applied. In this way, damage of the parts is prevented when the vehicle is rolling relatively slowly and the shafts 4 and 1 are not power transmittingly coupled to each other by means of the fluid clutch and when the speed of the engine falls below idling speed. Under these circumstances, the clutch element 17 will move to its engaged position and will tend to be engaged abruptly by one of the teeth 20a of the ratchet disc 20. The slip friction connection between the ratchet wheel 20 and the shaft 4, however, will dampen the abrupt effect of the sudden interengagement between the elements 17 and 20.

Also, the above described arrangement will serve to prevent the engine from stalling during slow movement of the vehicle. By virtue of the fact that the shafts 1 and 4 will become mechanically coupled to each other should the engine speed fall below idling, the engine will be automatically cranked if, for some reason or other, it stalls and drops below idling speed.

As set forth above, the shafts 4 and 7 are adapted to be non-rotatably connected to each other by means of a suitable additional mechanical clutch device. The same may include a clutch plate 5 rotatable with the shaft 4 and carrying a clutch element 5a. Another clutch element 7a is carried by the shaft 7 for rotation therewith and for sliding movement relative thereto. The clutch elements 5a and 7a are adapted to engage each other in such a manner as non-rotatably to connect the shafts 4 and 7.

The clutch plate 5 carries a shell or housing 5b within which a clutch element engaging member 6 is carried. The latter is pivotally secured to a lever 6a which is mounted upon a post 6b secured to the shell 5b, the arrangement of the parts being such that when the lever 6a is pivoted about its mounting on the post 6b in a clockwise direction, as viewed in Fig. 1, the member 6 serves to press the clutch elements 5a and 7a into engagement with each other. Conversely, when the lever 6a is pivoted in a counterclockwise direction, the clutch elements 5a and 7a are not pressed into engagement with each other. A spring 6c is provided for constantly biasing the member 6 leftwardly, as viewed in Fig. 1, so as constantly to urge the clutch elements 5a and 7a into engagement with each other.

A suitable actuating device is provided for pivoting the lever 6a in a counterclockwise direction. This actuating device includes a ring 8 which is adapted to be moved into the interior of the shell 5b and to engage the free end of the lever 6a. An actuating lever or yoke 9 is adapted to engage the ring 8 and to move the same leftwardly, thereby causing counterclockwise rotation of the lever 6a and rightward axial movement of the member 6, thereby relieving the clutch elements 5a and 7a from the pressure of the spring 6c. This may be accomplished by pivoting the lever 9 in a counterclockwise direction, as viewed in Fig. 1, about its pivot 9a.

The lever 9 is connected to a suitable operating device by means of which the clutch interconnecting the shafts 4 and 7 may be moved between its engaged and disengaged positions. In the illustrated embodiment the device is a fluid pressure responsive one, more particularly, a vacuum operated one indicated generally at 10. The device 10 is composed of shells 10a separated by a diaphragm 10b. A connecting rod or the like 9b extends through one of the shells 10a and interconnects the opposite free end of the lever 9 and the diaphragm 10b. The chamber formed by the other shell 10a and the diaphragm 10b is connected to a conduit 10c which places this chamber in communication with a valve indicated schematically at 11. The valve communicates with a conduit 12 and a conduit 12a, the former being in communication with a suitable source of vacuum, as, for example, the intake or intake manifold of the internal combustion engine of the vehicle, and the latter being in communication with atmosphere. The valve 11 is preferably an electromagnetically controlled one and is so constructed and arranged that when the electromagnet of the valve is not activated the valve places the conduit 10c in communication with the conduit 12a. However, when the valve 11 is actuated, the conduit 10c is placed in communication with the conduit 12. Thus, when the solenoid of the valve 11 is not energized, the chamber formed by the rightward shell 10a and the diaphragm 10b is vented to atmosphere, thereby permitting the spring 6c to press the member 6 leftwardly so as to place the clutch elements 5a and 7a into coupled relation with each other. This, in turn, non-rotatably or power transmittingly couples the shafts 4 and 7 to each other. When the solenoid of the valve 11 is energized, the chamber in question is placed in communication with a source of vacuum. This will cause the diaphragm 10b to bulge rightwardly, the chamber into which the rod 9b extends being suitably vented. The rod 9b is thus moved rightwardly, causing counter clockwise pivotal movement of the lever 9, leftward movement of the ring 8, counter clockwise pivotal movement of the lever 6a, rightward movement of the member 6, and consequent uncoupling between the shafts 4 and 7.

Upon deenergization of the solenoid of the valve 11, the clutch elements 5a and 7a will once again be moved into engaged position by the spring 6c.

According to the present invention the solenoid of the valve 11 is electrically connected to a suitable source of electrical energy, as, for example, a battery 26, by way of a switching device 14. The latter is operatively associated with the gear shift 13 of the vehicle, and the arrangement of the parts is such that the switch 14 is normally open but is moved to its closed position when the gear shift 13 is so manipulated as to shift gears. Consequently, the valve 11 is moved into that position thereof in which it places the conduit 10c in communication with the conduit 12 and therefore with the intake of the internal combustion engine when the gears of the vehicle are shifted. As a result, the mechanical clutch interconnecting the shafts 4 and 7 is automatically disengaged when the gear shift 13 is to shift the vehicle gears.

If desired, suitable means may be provided for damping the action of the device 10 when the same is vented after having been in communication with the intake of the internal combustion engine during operation thereof. In this way, a gradual engagement of the clutch elements 5a and 7a may be brought about. The arrangement may be such that the action of the means for damping the action of the device 10 is dependent upon the torque of the internal combustion engine.

While the device 10 has been shown as being a vacuum operated device, it will be understood that a suitable pressure operated device can be used. For example, the chamber formed by the left shell 10a and the diaphragm 10b may be a fluid-tight one into which a suitable fluid medium under pressure is introduced. The ingress and egress of the pressure fluid medium into such chamber may, of course, be controlled in any suitable manner.

The above described clutch arrangement, while capable of being used in any motor vehicle, is particularly adapted for use in heavy vehicles, such as trucks, busses, and the like.

It will be understood that each of the elements described above, or two or more together, may also find a useful application in other types of clutch arrangements differing from the types described above.

While the invention has been illustrated and described as embodied in a clutch arrangement particularly adapted to be used in motor vehicles, it is not intended to be limited to the details shown, since various modifications and structural changes may be made without departing in any way from the spirit of the present invention. For example, the clutch arrangement may be incorporated in a transmission device wherein each of the shafts is normally and freely rotatable in opposite direction.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A clutch arrangement comprising, in combination, first and second rotatable shafts; fluid clutch means interconnecting said shafts for placing the same into substantial power-transmitting relation with each other when at least one of said shafts rotates at at least a predetermined speed; mechanical clutch means interconnecting said shafts for automatically coupling the same to each other when said second shaft rotates in a predetermined direction faster than said first shaft; and means operatively associated with said mechanical clutch means for rendering the same inoperative when the rotational speed of said first shaft is at least as great as said predetermined speed, whereby said first and second shafts are mechanically connected to each other when said second shaft rotates in said predetermined direction faster than said first shaft but only so long as said first shaft rotates below said predetermined speed.

2. A clutch arrangement comprising, in combination, first and second rotatable shafts; fluid clutch means interconnecting said shafts for placing the same into substantial power-transmitting relation with each other when at least one of said shafts rotates at at least a predetermined speed; mechanical slipping clutch means interconnecting said shafts for automatically coupling the same to each other when said second shaft rotates in a predetermined direction faster than said first shaft; and means operatively associated with said mechanical clutch means for rendering the same inoperative when the rotational speed of said first shaft is at least as great as said predetermined speed, whereby said first and second shafts are mechanically connected to each other when said second shaft rotates in said predetermined direction faster than said first shaft but only so long as said first shaft rotates below said predetermined speed and only so long as the torque transmitted from said second shaft to said first shaft does not exceed a predetermined torque.

3. A clutch arrangement comprising, in combination, first and second shafts each rotatable in opposite directions; fluid clutch means interconnecting said shafts for placing the same into substantial power-transmitting relation with each other when at least one of said shafts rotates at at least a predetermined speed; mechanical clutch means interconnecting said shafts for automatically coupling the same to each other when said second shaft rotates in a predetermined direction faster than said first shaft and for automatically coupling said shafts to each other also when said first shaft rotates in the opposite direction faster than said second shaft; and means operatively associated with said mechanical clutch means for rendering the same inoperative when the rotational speed of said first shaft is at least as great as said predetermined speed, whereby said first and second shafts are mechanically connected to each other when said second shaft rotates in said predetermined direction faster than said first shaft but only so long as said first shaft rotates below said predetermined speed and whereby said first and second shafts are mechanically connected to each other when said first shaft rotates in said opposite direction faster than said second shaft but only so long as said first shaft rotates below said predetermined speed.

4. A clutch arrangement comprising, in combination, first and second shafts each rotatable in opposite directions; fluid clutch means interconnecting said shafts for placing the same into substantial power-transmitting relation with each other when at least one of said shafts rotates at at least a predetermined speed; mechanical slipping clutch means interconnecting said shafts for automatically coupling the same to each other when said second shaft rotates in a predetermined direction faster than said first shaft and for automatically coupling said shafts to each other also when said first shaft rotates in the opposite direction faster than said second shaft; and means operatively associated with said mechanical clutch means for rendering the same inoperative when the rotational speed of said first shaft is at least as great as said predetermined speed, whereby said first and second shafts are mechanically connected to each other when said second shaft rotates in said predetermined direction faster than said first shaft but only so long as said first shaft rotates below said predetermined speed and only so long as the torque transmitted from said second shaft to said first shaft does not exceed a predetermined torque and whereby said first and second shafts are mechanically connected to each other when said first shaft rotates in said opposite direction faster than said second shaft but only so long as said first shaft rotates below said predetermined speed and only so long as the torque transmitted from said first shaft to said second shaft does not exceed said predetermined torque.

5. In a self-propelled vehicle having an internal combustion engine and at least one driving wheel, a clutch arrangement, comprising, in combination, a first rotatable shaft adapted to be connected to the internal combustion engine in such a manner that the same during normal operation rotates said first shaft in one direction; a second rotatable shaft adapted to be connected to the driving wheel; fluid clutch means interconnecting said shafts for placing the same into substantial power-transmitting coupled relation with each other when at least one of said shafts rotates at least as fast as that rotational speed at which said first shaft rotates when the internal combustion engine idles; mechanical clutch means interconnecting said shafts for automatically power-transmittingly coupling the same to each other when said second shaft rotates in said one direction faster than said first shaft; and means operatively associated with said mechanical clutch means for rendering the same inoperative when the rotational speed of said first shaft is at least as great as that speed at which it rotates when the engine idles, whereby said first and second shafts are mechanically connected to each other when said second shaft rotates in said one direction faster than said first shaft but only so long as said first shaft rotates at a speed lower than that at which it rotates when the engine idles.

6. In a self-propelled vehicle having an internal combustion engine and at least one driving wheel, a clutch arrangement, comprising, in combination, a first rotatable shaft adapted to be connected to the internal combustion engine in such a manner that the same during normal operation rotates said first shaft in one direction; a second rotatable shaft adapted to be connected to the driving wheel; fluid clutch means interconnecting said shafts for placing the same into substantial power-transmitting coupled relation with each other when at least one of said shafts rotates at least as fast as that rotational speed at which said first shaft rotates when the internal combustion engine idles; mechanical slipping clutch means interconnecting said shafts for power-transmittingly coupling the same to each other when said second shaft rotates in said one direction faster than said first shaft; and means operatively associated with said mechanical clutch means for rendering the same inoperative when the rotational speed of said first shaft is at least as great as that speed at which it rotates when the engine idles, whereby said first and second shafts are mechanically connected to each other when said second shaft rotates in said one direction faster than said first shaft but only so long as said first shaft rotates at a speed lower than that at which it rotates when the engine idles and only so long as the torque transmitted from said second shaft to said first shaft does not exceed a predetermined torque.

7. In a self-propelled vehicle having an internal combustion engine and at least one driving wheel, a clutch arrangement, comprising, in combination, a first rotatable shaft adapted to be connected to the internal combustion engine in such a manner that the same during normal operation rotates said first shaft in one direction; a second rotatable shaft adapted to be connected to the driving wheel; fluid clutch means interconnecting said shafts for placing the same into substantial power-transmitting coupled relation with each other when at least one of said shafts rotates at least as fast as that rotational speed at which said first shaft rotates when the internal combustion engine idles; and mechanical clutch means interconnecting said shafts for power-transmittingly coupling the same to each other when both shafts rotate in said one direction with said first shaft rotating slower than said rotational speed at which it rotates when the internal combustion engine idles and not faster than said second shaft, said mechanical clutch means including first and second engageable clutching means with said second clutching means being carried by said second shaft for rotation therewith and with said first clutching means being carried by said first shaft for rotation therewith and for movement relative thereto between an engaged position wherein said first clutching means engages said second clutching means, thereby power-transmittingly coupling said first and second shafts, and a disengaged position wherein said first and second clutching means are out of engagement with each other so that said first and second shafts are not power-transmittingly coupled to each other by way of said mechanical clutch means, said first clutching means being so constructed, arranged and mounted on said first shaft that said first clutching means is in its engaged position when said first shaft rotates slower than said rotational speed at which it rotates when the internal combustion engine idles and so that said first clutching means is centrifuged into its disengaged position and is maintained therein when said first shaft rotates at least as fast as said last-mentioned rotational speed.

8. In a self-propelled vehicle having an internal combustion engine and at least one driving wheel, a clutch arrangement, comprising, in combination, a first rotatable shaft adapted to be connected to the internal combustion engine in such a manner that the same during normal operation rotates said first shaft in one direction; a second rotatable shaft adapted to be connected to the driving wheel; fluid clutch means interconnecting said shafts for placing the same into substantial power-transmitting coupled relation with each other when at least one of said shafts rotates at least as fast as that rotational speed at which said first shaft rotates when the internal combustion engine idles; and mechanical clutch means interconnecting said shafts for power-transmittingly coupling the same to each other when both shafts rotate in said one direction with said first shaft rotating slower than said rotational speed at which it rotates when the internal combustion engine idles and not faster than said second shaft, said mechanical clutch means including first and second engageable clutching means being carried by said second shaft for rotation therewith and with said first clutching means being carried by said first shaft for rotation therewith and for movement relative thereto toward and away from said second clutching means between an engaged position wherein said first clutching means engages said second clutching means, thereby power-transmittingly coupling said first and second shafts, and a disengaged position wherein said first and second clutching means are out of engagement with each other so that said first and second shafts are not power-transmittingly coupled to each other by way of said mechanical clutch means, said first clutching means being spring-biased toward said second clutching means into its engaged position and being so constructed, arranged and mounted on said first shaft that said first clutching means is maintained in its engaged position by the force of the spring-bias when said first shaft rotates slower than said rotational speed at which it rotates when the internal combustion engine idles and so that said first clutching means is centrifuged into its disengaged position against the action of the spring-bias and is maintained in said disengaged position when said first shaft rotates at least as fast as said last-mentioned rotational speed.

9. The combination defined in claim 8 wherein said first clutching means includes at least one clutching element mounted for pivotal movement about a pivot axis substantially parallel to the axis about which said first shaft rotates and spaced from the center of gravity of said clutching element.

10. The combination defined in claim 8 wherein said first and second clutching means are so constructed and arranged that when both of said shafts rotate in said one direction, said first and second clutching means power-transmittingly engage each other only when said second shaft tends to rotate at least as fast as said first shaft.

11. In a self-propelled vehicle having an internal combustion engine and at least one driving wheel, a clutch arrangement, comprising, in combination, a first rotatable shaft adapted to be connected to the internal combustion engine in such a manner that the same during normal operation rotates said first shaft in one direction; a second rotatable shaft adapted to be connected to the driving wheel; fluid clutch means interconnecting said shafts for placing the same into substantial power-transmitting coupled relation with each other when at least one of said shafts rotates at least as fast as that rotational speed at which said first shaft rotates when the internal combustion engine idles; and mechanical slipping clutch means interconnecting said shafts for power-transmittingly coupling the same to each other when both shafts rotate in said one direction with said first shaft rotating slower than said rotational speed at which it rotates when the internal combustion engine idles and not faster than said second shaft and when the torque transmitted from one of said shafts to the other of said shafts does not exceed a predetermined torque, said mechanical slipping clutch means including first and second engageable clutching means and the latter including a first clutch element carried by said second shaft for rotation therewith, a second clutch element carried by one of said shafts for rotation relative thereto, and slip friction means coupling said clutch elements to each other when the torque transmitted from one of said clutch elements to the other does not exceed said predetermined torque, said first clutching means being carried by said first shaft for rotation therewith and for movement relative thereto between an engaged position wherein said first clutching means engages said second clutch element of said second clutching means, thereby power-transmittingly coupling said first and second shafts in such a manner that a torque not exceeding said predetermined torque may be transmitted from one of said shafts to the other, and a disengaged position wherein said first clutching means and said second clutch element of said second clutching means are out of engagement with each other so that said first and second shafts are not power-transmittingly coupled to each other by way of said mechanical slipping clutch means, said first clutching means being so constructed, arranged and mounted on said first shaft that said first clutching means is in its engaged position when said first shaft rotates slower than said rotational speed at which it rotates when the internal combustion engine idles and so that said first clutching means is centrifuged into its disengaged position and is maintained therein when said first shaft rotates at least as fast as said last-mentioned rotational speed.

12. The combination defined in claim 11 wherein said second clutch element of said second clutching means is carried by said second shaft for rotation relative thereto, and wherein said slip friction means include adjacent first and second friction disc means rotatable with said first and second clutch elements, respectively and spring means constantly urging said first and second friction disc means into frictional engagement with each other.

13. The combination defined in claim 12, and adjusting means for adjusting the force with which said spring means urges said first and second friction disc means into frictional engagement with each other, whereby the torque capable of being transmitted from one of said friction disc means to the other and consequently from one of said shafts to the other by way of said mechanical slipping clutch means may be varied.

14. The combination defined in claim 13 wherein said spring means include an annular spring disc surrounding said second shaft and engaging one of said friction disc means, and wherein said adjusting means include a spring retaining member engaging said spring disc and mounted for axial movement along said second shaft so that the force with which said spring disc engages said one friction disc means may be varied by varying the axial position of said spring retaining member relative to said second shaft.

15. In a self-propelled vehicle having an internal combustion engine and at least one driving wheel, a clutch arrangement, comprising, in combination, a first rotatable shaft adapted to be connected to the internal combustion engine in such a manner that the same during normal operation rotates said first shaft in one direction; a second rotatable shaft; fluid clutch means interconnecting said first and second shafts for placing the same into substantial power-transmitting coupled relation with each other when at least one of said shafts rotates at least as fast as that rotational speed at which said first shaft rotates when the internal combustion engine idles; mechanical slipping clutch means interconnecting said first and second shafts for power-transmittingly coupling the same to each other when said second shaft rotates in said one direction faster than said first shaft; means operatively associated with said mechanical clutch means for rendering the same inoperative when the rotational speed of said first shaft is at least as great as that speed at which it rotates when the engine idles, whereby said first and second shafts are mechanically connected to each other when said second shaft rotates in said one direction faster than said first shaft but only so long as said first shaft rotates at a speed lower than that at which it rotates when the engine idles and only so long as the torque transmitted from said second shaft to said first shaft does not exceed a predetermined torque; a third rotatable shaft adapted to be connected to the driving wheel; additional clutch means interconnecting said second and third shafts and being movable between engaged and disengaged positions; and actuating means for moving said additional clutch means between its engaged and disengaged positions.

16. In a self-propelled vehicle having at least the driving wheel and an internal combustion engine in the intake of which a vacuum prevails during operation of the engine, a clutch arrangement, comprising, in combination, a first rotatable shaft adapted to be connected to the internal combustion engine in such a manner that the same during normal operation rotates said first shaft in one direction; a second rotatable shaft; fluid clutch means interconnecting said first and second shafts for placing the same into substantial power-transmitting coupled relation with each other when at least one of said shafts rotates at least as fast as that rotational speed at which said first shaft rotates when the internal combustion engine idles; mechanical slipping clutch means interconnecting said first and second shafts for power-transmittingly coupling the same to each other when said second shaft rotates in said one direction faster than said first shaft; means operatively associated with said mechanical clutch means for rendering the same inoperative when the rotational speed of said first shaft is at least as great as that speed at which it rotates when the engine idles, whereby said first and second shafts are mechanically connected to each other when said second shaft rotates in said one direction faster than said first shaft but only so long as said first shaft rotates at a speed lower than that at which it rotates when the engine idles and only so long as the torque transmitted from said second shaft to said first shaft does not exceed a predetermined torque; a third rotatable shaft adapted to be connected to the driving wheel; additional clutch means interconnecting said second and third shafts and being movable between engaged and disengaged positions, said additional clutch means being biased to its engaged position; and actuating means for moving said additional clutch means to its disengaged position against the action of the force biasing said additional clutch means into its engaged position, said actuating means including a vacuum-operated device connected to said additional clutch means in such a manner that when said vacuum-operated device is placed in communication with a source of vacuum said additional clutch means is moved into its disengaged position against the action of the force biasing it into its engaged position and when said vacuum-operated device is vented said additional clutch means is free to be moved back into its engaged position under the influence of the force biasing it thereinto, and conduit means for placing said vacuum-operated device into and out of communication with the intake of the internal combustion engine so that said vacuum-operated device may be placed into communication with a source of vacuum, the latter being constituted by the intake of the internal combustion engine during operation thereof.

17. The combination defined in claim 16, and means for damping the action of said vacuum-operated device when the same is vented after having been in communication wtih the intake of the internal combustion engine during operation thereof, thereby bringing about a gradual engagement of said additional clutch means.

18. The combination defined in claim 17 wherein the action of said means for damping the action of said vacuum-operated device is dependent upon the torque of the internal combustion engine.

19. The combination defined in claim 16, further comprising valve means in said conduit means and movable between a first position wherein said vacuum-operated device is in communication with the intake of the internal combustion engine and a second position wherein said vacuum-operated device is vented.

20. The combination defined in claim 19 wherein the self-propelled vehicle also has a gear shift and wherein said valve means is biased to its second position, and wherein said combination further comprises electrical operating means for moving said valve means into its first position against the action of the force biasing it into its second position, said electrical operating means being operatively connected to the gear shift in such a manner that said valve is automatically moved into its first position when the gear shift is so manipulated as to shift gears so that during operation of the internal combustion engine said additional clutch means is automatically moved to its disengaged position.

21. In a self propelled vehicle, a clutch arrangement comprising, in combination, drive means including a drive shaft adapted to be connected to an engine on the vehicle, and an impeller member fixedly connected to said drive shaft for rotation therewith; driven means including a driven shaft adapted to be connected to propelling means on the vehicle, and a runner member fixedly connected to said driven shaft for rotation therewith, said impeller member and runner member forming parts of a fluid clutch connecting said drive shaft with said driven shaft as a fluid coupling when one of said shafts rotates at least at a predetermined speed adapted to correspond to the idling speed of the engine; and a mechanical clutch including centrifugal first clutch means connected to one of said means for rotation therewith and being movable thereon between an inoperative position and a coupling position, a second clutch means connected to the other of said means for rotation therewith and having a portion engaged by said first clutch means in said coupling position for mechanically coupling said drive shaft with said driven shaft, and means urging said centrifugal clutch means to said coupling position; said centrifugal first clutch means moving to said inoperative position when the rotary speed of said one means exceeds said predetermined speed.

22. In a self propelled vehicle, a clutch arrangement comprising, in combination, drive means including a drive shaft adapted to be connected to an engine on the vehicle, and an impeller member fixedly connected to said drive shaft for rotation therewith; driven means including a driven shaft adapted to be connected to propelling means on the vehicle, and a runner member fixedly connected to said driven shaft for rotation therewith, said impeller member and runner member forming parts of a fluid clutch connecting said drive shaft with said driven shaft as a fluid coupling when one of said shafts rotates at least at a predetermined speed adapted to correspond to the idling speed of the engine; and a mechanical clutch including centrifugal first clutch means connected to said drive means for rotation therewith and being movable thereon between an inoperative position and a coupling position, a second clutch means connected to said driven means for rotation therewith and having a portion engaged by said first clutch means in said coupling position for mechanically coupling said drive shaft with said driven shaft, means urging said centrifugal first clutch means to said coupling position; said centrifugal first clutch means moving to said inoperative position when the rotary speed of said drive means exceeds said predetermined speed.

23. In a self propelled vehicle, a clutch arrangement comprising, in combination, drive means including a drive shaft adapted to be connected to an engine on the vehicle, and an impeller member fixedly connected to said drive shaft for rotation therewith, said drive means rotating in one direction during forward movement of the vehicle, driven means including a driven shaft adapted to be connected to propelling means on the vehicle, and a runner member fixedly connected to said driven shaft for rotation therewith, said impeller member and runner member forming parts of a fluid clutch connecting said drive shaft with said driven shaft as a fluid coupling when one of said shafts rotates at least at a predetermined speed adapted to correspond to the idling speed of the engine; and a mechanical clutch including centrifugal first clutch means connected to said drive means for rotation therewith and being movable thereon between an inoperative position and a coupling position, a second clutch means connected to said driven means for rotation therewith and having a portion engaged by said first clutch means in said coupling position for mechanically coupling said drive shaft with said driven shaft only during rotary movement in said one direction, said second clutch means including friction means between the portion thereof engaged by said first clutch means, and the portion thereof connected to said driven shaft to permit slipping when a predetermined torque is exceeded, and means urging said centrifugal first clutch means to said coupling position; said centrifugal first clutch means moving to said inoperative position when the rotary speed of said drive means exceeds said predetermined speed.

24. In a self propelled vehicle, a clutch arrangement comprising, in combination, drive means including a drive shaft adapted to be connected to an engine on the vehicle, and an impeller member fixedly connected to said drive shaft for rotation therewith, said drive means rotating in one direction during forward movement of the vehicle; driven means including a driven shaft adapted to be connected to propelling means on the vehicle, and a runner member fixedly connected to said driven shaft for rotation therewith, said impeller member and runner member forming parts of a fluid clutch connecting said drive shaft with said driven shaft as a fluid coupling when one of said shafts rotates at least at a predetermined speed adapted to correspond to the idling speed of the engine; and a mechanical clutch including a plurality of pawls pivotally mounted on said drive means for rotation therewith and being movable thereon between an inoperative position and a coupling position, said pawls moving to said inoperative position when the rotary speed of said drive means exceeds said predetermined speed, means for moving said pawls to said coupling position when the speed of said drive means is below said predetermined speed, and a clutch means fixedly connected to said driven means for rotation therewith and having a peripheral ratchet portion engaged by said pawls in coupling position for mechanically coupling said drive means with said driven means during rotation in said one direction.

25. In a self propelled vehicle, a clutch arrangement comprising, in combination, drive means including a drive shaft adapted to be connected to an engine on the vehicle, and an impeller member fixedly connected to said drive shaft for rotation therewith, said drive means rotating in one direction during forward movement of the vehicle; driven means including a driven shaft adapted to be connected to propelling means on the vehicle, and a runner member fixedly connected to said driven shaft for rotation therewith, said impeller member and runner member forming parts of a fluid clutch connecting said drive shaft with said driven shaft as a fluid coupling when one of said shafts rotates at least at a predetermined speed adapted to correspond to the idling speed of the engine; and a mechanical clutch including a plurality of pawls pivotally mounted on said drive means for rotation therewith and being movable thereon between an inoperative position and a coupling position, said pawls moving to said inoperative position when the rotary speed of said drive means exceeds said predetermined speed, means for moving said pawls to said coupling position when the speed of said drive means is below said predetermined speed, and a clutch means fixedly connected to said driven means for rotation therewith and having a peripheral ratchet portion engaged by said pawls in coupling position for mechanically coupling said drive means with said driven means during rotation in said one direction, said clutch means including friction means between said peripheral ratchet portion and the portion thereof which is connected to said driven shaft to permit slipping when a predetermined torque is exceeded.

References Cited in the file of this patent

UNITED STATES PATENTS

| 2,045,615 | Rosle et al. | June 30, 1936 |
| 2,258,684 | Lysholm et al. | Oct. 14, 1941 |
| 2,333,680 | Schneider et al. | Nov. 9, 1943 |
| 2,648,414 | Maurger | Aug. 11, 1953 |
| 2,766,862 | Binder | Oct. 16, 1956 |

FOREIGN PATENTS

| 1,073,574 | France | Sept. 27, 1954 |